US010469483B2

(12) United States Patent
Lightbody

(10) Patent No.: US 10,469,483 B2
(45) Date of Patent: Nov. 5, 2019

(54) ELECTRONIC DEVICE FACILITATING PASSWORD ENTRY AND RECALL

(71) Applicant: Torin Lightbody, Saanichton (CA)

(72) Inventor: Torin Lightbody, Saanichton (CA)

( * ) Notice: Subject to any disclaimer, the term of this patent is extended or adjusted under 35 U.S.C. 154(b) by 7 days.

(21) Appl. No.: 15/838,362

(22) Filed: Dec. 12, 2017

(65) Prior Publication Data

US 2018/0191704 A1 Jul. 5, 2018

(51) Int. Cl.
| *G06F 21/34* | (2013.01) |
| *G06F 21/45* | (2013.01) |
| *G06F 3/023* | (2006.01) |
| *G06Q 20/20* | (2012.01) |
| *H04L 29/06* | (2006.01) |
| *G06F 3/0484* | (2013.01) |

(52) U.S. Cl.
CPC .......... *H04L 63/083* (2013.01); *G06F 3/023* (2013.01); *G06F 3/0233* (2013.01); *G06F 3/0238* (2013.01); *G06F 3/0484* (2013.01); *G06F 21/45* (2013.01); *G06F 21/34* (2013.01); *G06Q 20/206* (2013.01); *H04L 63/0853* (2013.01)

(58) Field of Classification Search
CPC ... H04L 63/083; G06F 3/0484; G06F 3/0233; G06F 21/34; G06Q 20/206
See application file for complete search history.

(56) References Cited

U.S. PATENT DOCUMENTS

| 4,638,306 | A | * | 1/1987 | Rollhaus | B41J 5/10 341/28 |
| 5,384,825 | A | * | 1/1995 | Dillard | H04M 1/274566 455/564 |
| 5,535,421 | A | * | 7/1996 | Weinreich | G06F 3/0235 708/146 |
| 6,650,254 | B1 | * | 11/2003 | Rix | G06F 3/0202 341/20 |
| 7,069,584 | B1 | * | 6/2006 | Davis | G06Q 20/4012 380/268 |
| 7,196,691 | B1 | * | 3/2007 | Zweig | G06F 3/0233 345/168 |
| 7,814,331 | B2 | * | 10/2010 | Ogawa | H04L 9/3226 713/184 |
| 9,513,779 | B2 | | 12/2016 | Brown et al. | |
| 2005/0139658 | A1 | * | 6/2005 | Lambert | G06F 21/31 235/382.5 |
| 2011/0106792 | A1 | * | 5/2011 | Robertson | G10L 15/26 707/723 |
| 2011/0247060 | A1 | | 10/2011 | Whitmyer et al. | |
| 2013/0013925 | A1 | * | 1/2013 | Buer | H04L 9/3234 713/168 |

* cited by examiner

*Primary Examiner* — Lewis G West

(57) ABSTRACT

The invention relates to a human interface device that may mitigate the difficulty in remembering and entering long and complex passwords. The device comprises a processor, keypad and memory. The processor accepts keypad entries and sends determined strings through a communications interface to a remote computing device. The determined strings correspond to the entries.

20 Claims, 4 Drawing Sheets

ELECTRONIC DEVICE FACILITATING PASSWORD ENTRY AND RECALL

TECHNICAL FIELD

The present application claims priority under 35 U.S.C. 119(b) and 37 CFR 1.55 to Canadian patent application serial number 2,953,356 filed Dec. 29, 2016 which is hereby incorporated by reference in its entirety.

BACKGROUND

Previous disclosures relating to the entry of passwords include U.S. Pat. No. 9,513,779 ("Brown et al.") and US Patent Application 20110247060 ("Whitmyer J R.")

To use many services and functionalities of computing devices, it is necessary to have an account and enter a password to gain access. This is done to prevent unauthorized access to the service or functionality. To prevent unauthorized entities from gaining access to these services and/or functionalities, more and more long and complex passwords are being required. This is due in some part to the increasing sophistication of entities (such as hackers) in "cracking" passwords.

For example, a banking website may require a user to have a password with a minimum length (perhaps 8 characters) containing characters from 3 of 4 categories (such as lower case letters, upper case letters, numbers and symbols.) The larger the number of characters and categories employed in a password, the more combinations are possible and thus the greater difficulty in "cracking" the password.

Unfortunately, the longer and more complex the password, the more difficult it is for a human to remember. This may lead to a person using various strategies in password creation that may make the password less secure. Such strategies may include using a single password for many different uses (different websites, computer logins, etc.) or using common passwords that are easy to guess ("Passw0rd", "Letmein!", etc.) These strategies may reduce the effectiveness of requiring long and complex passwords.

Accordingly, additional, alternative, and/or improved devices and methods for password entry while also overcoming at least some of the challenges described above remain highly desirable.

BRIEF DESCRIPTION OF THE DRAWINGS

Further features and advantages of the present disclosure will become apparent from the following detailed description, in combination with the appended drawings, in which.

DETAILED DESCRIPTION

The present invention relates to a device and method for entering a password into a computing resource (such as an operating system login, website login, etc.) The invention allows the entry of a complex and/or long password while only requiring the user to enter a comparatively short and simple set of keystrokes or keypad entry "taps" into a finger sensing input.

Figure 1:
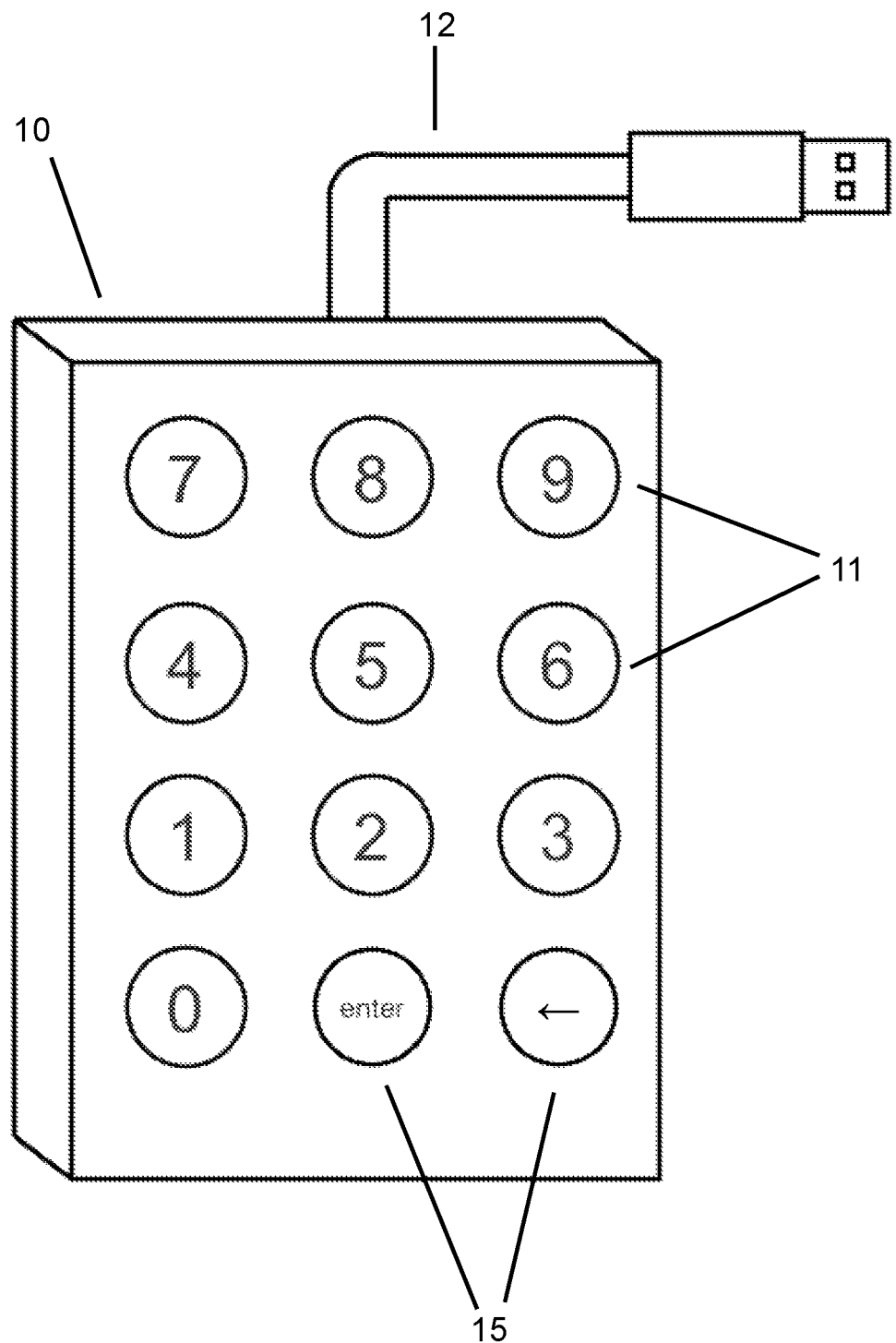
FIG. 1 shows an outside view of a human interface device according to the invention.

Referring to FIG. 1, a outside view of a human interface device (HID) 10 is provided. The HID comprises a plurality of keys 11. The keys may be labelled with appropriate symbols (for example "1", "2", "3", "A", "B", "C", appropriate symbols in different alphabets or languages, etc.) and may include special function keys 15 such as "Enter", "Shift", "Backspace" or "Delete". A communication wire 12 may be provided in some embodiments.

Figure 2:
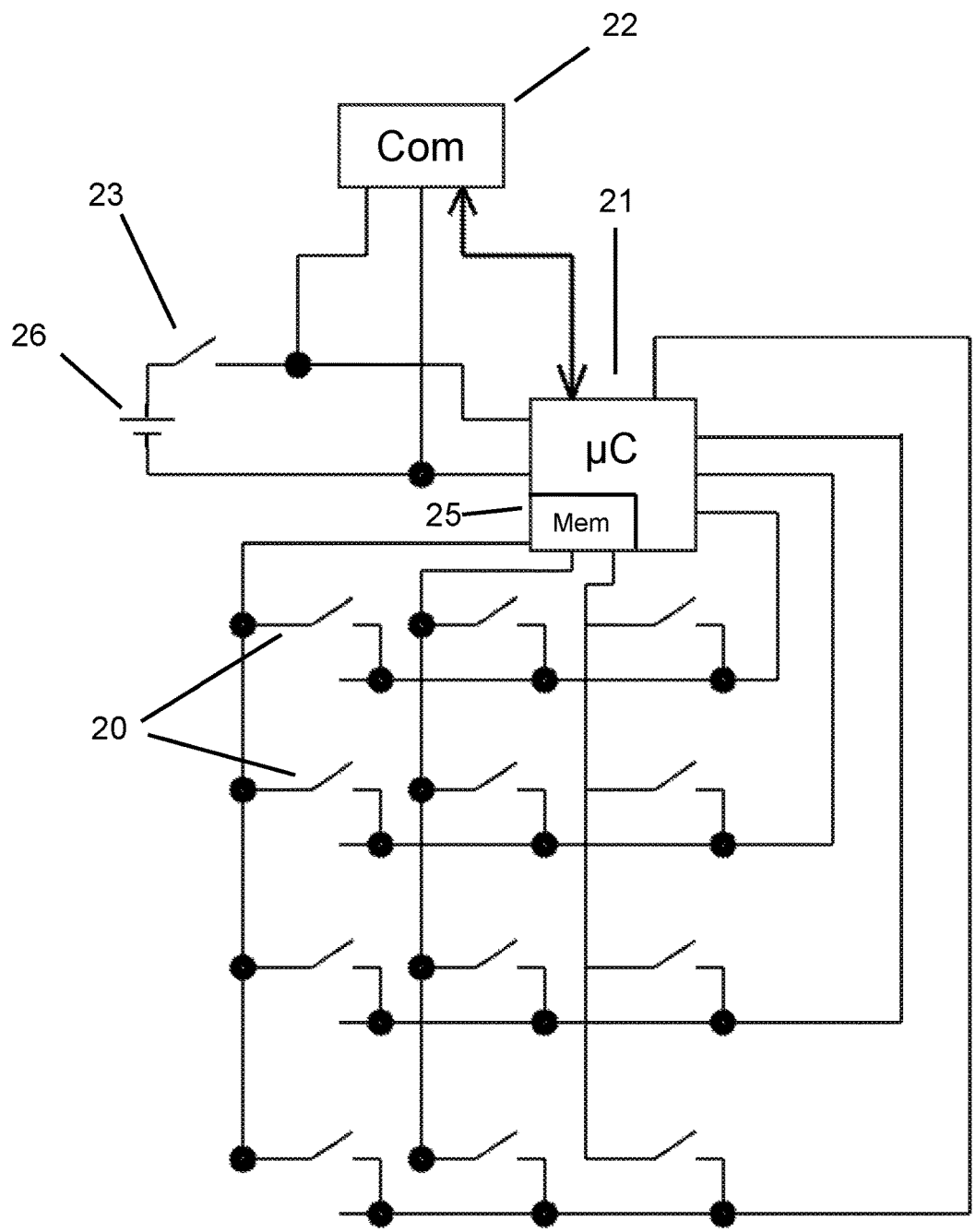
FIG. 2 shows a schematic representation of the human interface device according to the invention.
Figure 3:
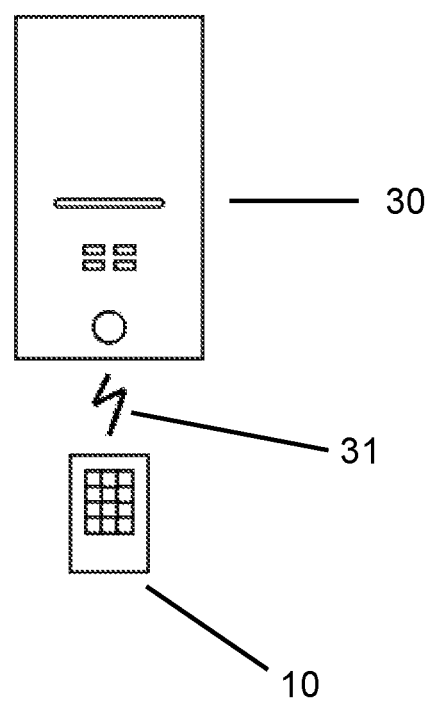
FIG. 3 shows a pictorial view of a system incorporating the human interface device of the invention.

Referring to FIG. 2, a schematic representation of the circuitry of a human interface device (HID) 10 is provided. The keys 11 may comprise switches 20 that provide a signal interpret-able by microcontroller 21 in order to determine which key is being pressed. Instead of switches 20, the keys may comprise capacitive sense elements to allow the microcontroller 21 to determine which key is being pressed or actuated. Alternatively, another type of human input sensing may be used. The microcontroller is thus able to sense the fingers of a user actuating the keys. The microcontroller is coupled to a communications interface 22 in order to communicate with a remote computing device 30 (FIG. 3.) The computing device may be a personal computer, mobile phone, tablet or similar device. The communications interface may be a wired interface (such as USB) or a wireless interface (such as Bluetooth™ or NFC.) This interface facilitates a communication link 31 between the computing device 30 and the HID 10. A battery 26 may be provided to power the circuitry of the HID 10. Alternatively, power may be provided by the wired interface. A power disconnect switch 23 may be provided to disconnect power from the HID 10 in order to prevent operation when not desired. (For example, at any time when password entry is not required.)

When a user taps or presses a key 11, the press is detected by the microcontroller 21. The microcontroller then sends a determined string of characters over the communications interface 22 to the computing device 30. For example if the user presses the "1" key, the microcontroller may send the string "Ti9%" to the computing device. If the user presses the "2" key, the microcontroller may send the string "7N@P". The determined strings may thus include at least some or all of the categories (lower case letter, upper case letter, number and symbol) often required by websites, computer systems, etc. In addition, for the remainder of the keys 11, the microcontroller may send different strings that are longer and more complex than a single character. The microcontroller looks up which string to send in response to which key is pressed in a memory 25. The memory may be integral to the microcontroller or external. At least a portion of memory 25 may be non-volatile, thus not requiring power to retain the strings.

A special function key 15 may comprise an ENTER key. When the microcontroller detects that the enter key has been pressed, it may communicate with the computing device 30 to indicate that the ENTER key has been pressed (for example for indicating that password entry is complete.) Another special function key 15 may comprise a BACKSPACE key. When the microcontroller detects a keypress on this key it may send an indication to the computing device to backspace a determined number of times (eg. four times if pressing a key 11 results in a string of four characters being communicated to the computing device.) A different special function key 15 or combination of keypresses may be used to change the number of characters sent in the string when keys 11 are pressed.

Therefore, the user may enter a simple set of key presses (eg. "4", "2", "9"), but the computing device will receive a more complex entry string (eg., "9B#a % cXk2AMy"). In addition, if the user makes an error and enters an incorrect key press, and then presses the backspace key, the microcontroller will indicate to the computing device that an appropriate number of characters (eg. four) be deleted. Therefore, the user may enter a simple key press sequence, correcting errors if necessary, while the computing device receives a comparatively long and complex sequence.

The microcontroller 21 may communicate with the computing device 30 through communications interface 22 such that the HID 10 appears as a USB HID keyboard or Bluetooth™ keyboard to the computing device 30.

Figure 4:
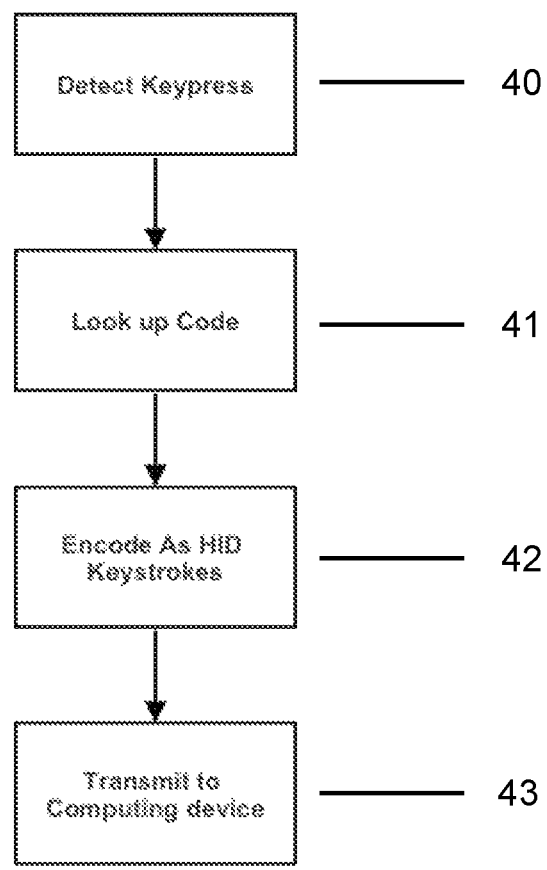
FIG. 4 shows a flowchart of the operation of the human interface device of the invention.

Referring to FIG. 4, a flowchart of the operation of the device is shown. During operation, the microcontroller 21 detects a keypress (block 40). It then looks up the appropriate string code in memory 25 (block 41). The microcontroller then encodes this code as a sequence of keystrokes (block 42) and this sequence of keystrokes is transmitted to the computing device 30 (block 43.) The sequence of keystrokes retrieved from the memory corresponding to a particular keypress can be changed by pressing a special function key 15 or combination of keys. If the enter button is pressed, an enter indication is transmitted to the computing device 30. If the backspace button is pressed, a plurality of backspace indications are transmitted to the computing device wherein the number of backspace characters transmitted corresponds to the number of keystroke indications transmitted per keypress.

During manufacture of the HID 10, each individual HID being manufactured may receive a unique set of complex strings for use when each individual key 15 is pressed. These strings are programmed into the memory 25 of each individual HID. Therefore, the strings generated in response to key presses for each HID manufactured are unique or as close to unique as practical. Given that each individual HID produces different complex strings in response to key presses, physical possession of a particular HID in addition to knowledge of the simple set of key presses a given user used for a password would be required to practically reproduce the password.

The manufacturer may apply a serial number to each HID manufactured. In addition, the complex strings stored in each individual HID may be stored in a database by the manufacturer along with the serial numbers so that a replacement HID for a specific customer can be created if the customer's HID is lost, broken, etc. Alternatively, the complex strings in each individual HID may be stored only in the individual HID so that there is little chance of being able to duplicate the complex strings.

In an alternate embodiment, the complex strings in the memory 25 may be programmable by the user, thus providing the user with a high degree of confidence that the complex strings are known only to them.

The HID 10 may appear to the computing device 30 to be a conventional USB or Bluetooth keyboard even though it is not. Therefore, the computing device 30 may not need any special or additional drivers to utilize the invention.

Therefore, the HID 10 provides a means for a human user to be relieved of the burden of remembering long and/or complex passwords without an unacceptable increase in the likelihood of an undesired entity discovering the password. The user need only remember comparatively short and/or simple sequences of keypresses on the HID to enter a comparatively long and/or complex password into the computing device 30. Labelling the keys 11 with individual or groups of letters or symbols may further aid in remembering these sequences.

I claim:

1. An electronic human interface device comprising:
    processing logic;
    a memory coupled to said processor and adapted to store a multiplicity of determined strings of multiple characters;
    a plurality of human input sensors coupled to said processing logic; and
    a communications interface coupled to said processing logic and adapted to communicate with a computing device;
    wherein;
    said human interface device is portable;
    said processing logic is operable to transmit at least one of said determined strings of multiple characters through said communications interface in response to actuation of each of said plurality of human input sensors;
    each of said determined strings of multiple characters is as close to unique as practically possible, both from each determined string on the device and other similar manufactured devices; and
    a sequence of said determined strings of multiple characters comprise a password.

2. The electronic human interface device of claim 1 further comprising;
    a power switch coupled to facilitate application and removal of power to at least one circuit element of said electronic human interface device;
    wherein said circuit element comprises at least one of said processing logic, said memory, said human input sensors and said communication interface.

3. The electronic human interface device of claim 1 wherein said communications interface comprises a wired interface.

4. The electronic human interface device of claim 3 wherein said plurality of human input sensors are arranged in standard numeric layout.

5. The electronic human interface device of claim 1 wherein said communications interface comprises a wireless interface.

6. The electronic human interface device of claim 5 wherein said communications interface comprises a Bluetooth™ interface.

7. The electronic human interface device of claim 5 wherein said communications interface comprises an NFC interface.

8. The electronic human interface device of claim 1 wherein at least a portion of said memory is non-volatile.

9. The electronic human interface device of claim 8 wherein said portion of said memory is operable to be programmed with strings different than alternate strings for at least a second electronic human interface device.

10. The electronic human interface device of claim 8 wherein said memory is user programmable.

11. The electronic human interface device of claim 1 further comprising:
    a backspace button;
    wherein said processing logic is further adapted to transmit a number of backspace indications to said computing device in response to actuation of said backspace button; and further wherein said number is equal to the length of at least one of said determined strings of multiple characters.

12. A method for facilitating the entry of a password to an electronic device comprising:
   detecting a plurality of keypresses on an HID;
   determining by said HID a unique as possible multiple character string code for each individual one of said keypresses;
   encoding each of said string codes as a sequence of individual keystroke entries;
   transmitting an indication of said individual keystrokes entries to said electronic device;
   wherein said plurality of keypresses comprises said password; said determining ensures said string codes from said HID are different than other similar HIDs; and said HID is portable.

13. The method of claim 12 wherein said detecting further comprises:
   executing programming code in a microcontroller to detect a binary state of a circuit element.

14. The method of claim 13 wherein said determining further comprises:
   executing programming code in said microcontroller to read a memory containing each of said string codes corresponding to each of said keypresses.

15. The method of claim 12 wherein said transmitting comprises wirelessly transmitting.

16. The method of claim 12 further comprising:
   applying a serial number to said HID;
   storing said string codes in said HID; and
   storing said string codes in a database.

17. The method of claim 12 further comprising:
   identifying at least one of said plurality of keypresses as a special keypress; and
   changing at least one of said string codes corresponding to at least one of an additional different one of said keypresses to a different string code in response to said identifying.

18. The method of claim 12 further comprising:
   preventing at least one of said detecting, determining, encoding or transmitting by preventing application of power to a circuit element.

19. The method of claim 12 further comprising:
   programming said determined string code into a non-volatile memory; and
   programming a second string code different from said determined string code into a second non-volatile memory.

20. The method of claim 12 further comprising:
   communicating said sequence of individual keystroke entries as though they originate from a conventional keyboard device.

* * * * *